2,890,958

MANUFACTURE OF EDIBLE FOOD CONTAINERS

Cecil H. Birnkrant, Beverly Hills, Calif., assignor to Birnkrant Frozen Confection Co., Los Angeles County, Calif., a limited partnership of California No Drawing. Application August 30, 1956
Serial No. 606,998

6 Claims. (Cl. 99—88)

This invention relates to food containers and, it is more particularly concerned with edible food containers, such as, for ice cream, frozen custards, sherbets, and similar confectionary ices.

In my copending application for patent Ser. No. 512,870, filed June 2, 1955, I have described a method of manufacturing an edible container whereby a batter, formed of ingredients having a mealy consistency and being flowable under heat and pressure, is placed in a hot pressure mold to cause the batter to flow and assume the shape of the mold, whereupon the formed batter is removed from the mold and then baked in the naked state outside the mold.

I have now found that this process may be so modified as to make it unnecessary to subject the batter to any baking whatsoever, either within or without the mold. This is made possible by using a batter having a very low moisture content, and raising the temperature of the mold considerably whereby the batter while subjected to the heat and pressure of the mold becomes rigidified to an extent sufficient to permit it to be used immediately as a container. Moreover, the resulting product is much more tasteful and palatable, the confectionary quality of the product being developed to its highest degree when a frozen confectionary material in a fluid or soft state is placed in it while hot, after it is ejected from the mold and promptly thereafter set in a refrigeration storage room to harden the confectionary material.

The present invention has an important distinction from the so-called rolled sugar cones which are made by rolling a hot wafer of high sugar content into a conical shape and then permitting it to cool in order to retain its shape. In the present invention, the shape of the final container is retained at the shaping temperature so that it can be immediately ejected from the mold and used without waiting to cool. This is important in mass production operations where the cooling or setting time is a factor adversely affecting the rate of production.

Accordingly, one of the objects of this invention is the provision of a method of manufacturing edible containers in which the containers are formed under heat and pressure, but which do not require any cooling period to rigidify the container for immediate use.

Another object of the invention is the provision of a method of manufacturing edible food containers in which the batter after being placed in a hot pressure mold, can be immediately ejected and promptly used without any prolonged baking period either within or on the outside of the mold.

A still further object of this invention is the provision of a batter composition which can be used to carry out the method of this invention.

A still further object of this invention is the provision of an edible food container resulting from the method referred to having a highly delicate and delicious confectionary flavor, which is particularly suitable for holding ice cream and similar frozen confectionary products.

A still further object of the invention is the provision of such an edible food container which retains its rigidity in contact with liquids, such as melted or soft ice cream, ices, sherbets, custards, syrups, toppings, etc., thereby making it especially suitable for preparing fountain specialty items, such as sundaes, that can be eaten along with the contents thereof.

In general, the method of the present invention comprises forming at room temperature a dry-like mealy or crumb type batter that is plastic and mold flowable at elevated temperatures, that is, the particles or crumbs combine into a continuous mass. The moisture content of the batter is held to as low a point as possible, so that upon subjecting it to the action of a hot pressure mold, it rigidifies upon the escape of moisture in the form of steam during the very short period required for the molding. In this state it is ejected from the mold and can be used as a container immediately without any further baking either within the mold or on the outside. In other words, the formed batter is removed from the mold immediately after it is formed therein and it is used immediately as a container. The presence of the batter in the mold is of a very short duration, just sufficient to complete the flow of the batter to the shape of the mold. While the batter is thus formed, sufficient steam evolves to result in it becoming sufficiently rigid to be used as a container.

Thus the operation is continuous from the time the batter is poured into the mold until the time the final container is filled with the material it is to contain. The time required for baking is completely eliminated.

The success of the present invention depends to a large extent upon the use of a batter suitable for the purpose and the handling of the batter after it has been made up in relation to the mold. A suitable batter for the purpose should contain the following ingredients or their equivalents in the approximate relative quantities indicated:

| | |
|---|---|
| Wheat or pastry flour | 1 pound. |
| Powdered milk (whole or skim, but preferably skim) | 4 level tablespoons. |
| Sugar | 1 pound. |
| Cocoa or soya bean flour | ¼ pound. |
| Eggs (whole or equivalent reconstituted dried eggs) | 2. |

Any of the usual coloring, flavoring and leavening agents may be added.

The batter is prepared in the form of a mealy or crumb consistency.

The following will illustrate, by way of example, the invention, and the manner in which it may be practiced:

*Example*

A dry mix is prepared of 1 pound sifted pastry flour, ¼ pound cocoa, 4 level tablespoons powdered skim milk, and 1 light level teaspoon baking soda. A wet mix is separately prepared of 1 pound sugar, 2 whole fresh eggs (9 eggs weigh 1 pound), 2 ounces unsweetened baking chocolate, 1 teaspoon vanilla extract and 1 light teaspoon salt. The eggs are first beaten and the sugar slowly added thereto with constant stirring. The salt, vanilla extract and chocolate in melted form is then added with constant stirring. The previously prepared dry mix is then added slowly to the wet mix with continued stirring. The resulting batter will have a dry-mealy or crumb consistency. The batter is placed into the female part of a two part mold that has been previously heated to a temperature in the range of 400 to 500 degrees Fahrenheit. The male part of the mold is then inserted under pressure, the temperature of which has been first brought to a point in the range of 450° to 600° F., but preferably hotter than the female mold by about 50° to 150° F. Under these conditions of heat and pressure, the particles of batter flow together in a continuous mass and assume the shape of the forming mold. The small amount of free moisture in the batter is quickly converted to steam and escapes simultaneously with the forming operation. The formed batter is then sufficiently rigid to be ejected from the mold and used as a container without any baking thereof. Hence, the mold is upset, whereupon the formed container clings to the female part because it is cooler than the male part, whereupon the final container is released from the female part and can be immediately used as a container while hot. The container while hot is filled with soft or fluid ice cream. It resists softening and may be placed with its contents in refrigerated storage to harden the ice cream, the result of which is a highly palatable confectionary specialty item.

If the container is not promptly filled with the ice cream after it is ejected from the hot mold, it is preferred to reheat it in an oven or by some other suitable means before filling, because of the more palatable product resulting therefrom.

Having thus described my invention, I claim:

1. The method of making an edible confectionary product comprising forming a thermosetting confectionary batter in the form of substantially dry, pressure-cohesive particles, a unit quantity of said batter consisting essentially of 1 pound wheat flour, 1 pound sugar, 4 level tablespoons powdered milk, 2 eggs and ¼ pound of a material selected from the group consisting of cocoa and soya bean flour, subjecting the batter instantaneously to a hot pressure mold to cause the particles to coalesce and assume the shape of the mold under the mold pressure and to become rigidified by the heat of the mold, then promptly removing the rigid, shaped batter in one piece from the mold as an edible product and cooling it.

2. The method as defined by claim 1 in which the temperature of the mold is in the range of 400° to 600° F.

3. The method as defined by claim 1 in which the mold is a two-part mold having separable male and female parts, said female part being heated to a temperature in the range of 400° to 550° F., and the male part being heated to a temperature of 450° to 600° F., the male part being maintained 50° to 150° hotter than the female part, whereby the edible container, after it is formed in the mold will selectively adhere to the female part.

4. The method of making an edible confectionary product comprising forming a thermosetting confectionary batter in the form of substantially dry pressure-cohesive particles, a unit quantity of said batter consisting essentially of 1 pound wheat flour, 1 pound sugar, 4 level tablespoons powdered milk, 2 eggs and ¼ pound of a material selected from the group consisting of cocoa and soya bean flour, subjecting the batter instantaneously to a hot pressure mold in the shape of a container to cause the particles to coalesce and assume the shape of the mold and to become rigidified by the heat of the mold, then promptly removing the shaped batter in one piece from the mold as an edible container, promptly filling the container while hot with an ice cream confection and then subjecting it to a temperature below the freezing point of the ice confection.

5. The method of making an edible confectionary product comprising forming a thermosetting confectionary batter in the form of substantially dry, pressure-cohesive particles, a unit quantity of said batter consisting essentially of 1 pound wheat flour, 1 pound sugar, 4 level tablespoons powdered milk, 2 eggs and ¼ pound of cocoa, subjecting the batter instantaneously to a hot pressure mold to cause the particles to coalesce and assume the shape of the mold under the mold pressure and to become rigidified by the heat of the mold, then promptly removing the rigid, shaped batter in one piece from the mold as an edible product and cooling it.

6. The method of making an edible confectionary product comprising forming a thermosetting confectionary batter in the form of substantially dry, pressure-cohesive particles, a unit quantity of said batter consisting essentially of 1 pound wheat flour, 1 pound sugar, 4 level tablespoons powdered milk, 2 eggs and ¼ pound of soya bean flour, subjecting the batter instantaneously to a hot pressure mold to cause the particles to coalesce and assume the shape of the mold under the mold pressure and to become rigidified by the heat of the mold, then promptly removing the rigid, shaped batter in one piece from the mold as an edible product and cooling it.

References Cited in the file of this patent

UNITED STATES PATENTS

| | | |
|---|---|---|
| 1,850,356 | Parr | Mar. 22, 1932 |
| 2,255,506 | Frediani | Sept. 9, 1941 |
| 2,394,791 | Lloyd et al. | Feb. 12, 1946 |
| 2,694,012 | Washburn | Nov. 9, 1954 |